US008970628B1

United States Patent
Jensen et al.

(10) Patent No.: US 8,970,628 B1
(45) Date of Patent: *Mar. 3, 2015

(54) GRAPHICAL USER INTERFACE FOR PERFORMING DEFORMATIONS

(75) Inventors: Robert Jensen, Berkeley, CA (US); Oren Jacob, Piedmont, CA (US); Eric Gregory, Larkspur, CA (US); Wilson Taylor Holliday, Sacramento, CA (US); Andrew Justin Butts, Emeryville, CA (US)

(73) Assignee: PIXAR, Emeryville, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 12/973,658

(22) Filed: Dec. 20, 2010

Related U.S. Application Data

(63) Continuation-in-part of application No. 12/396,320, filed on Mar. 2, 2009, now Pat. No. 8,279,239.

(51) Int. Cl.
*G09G 5/00* (2006.01)

(52) U.S. Cl.
USPC ............................ 345/647; 345/419; 345/420

(58) Field of Classification Search
CPC .................. G06F 3/0481; G06F 2203/04805; G06T 5/006; G06T 19/00; G06T 17/20; G06T 17/00
USPC .................................. 345/419, 647, 423, 420
See application file for complete search history.

(56) References Cited

U.S. PATENT DOCUMENTS

| | | | | |
|---|---|---|---|---|
| 6,608,631 B1 * | 8/2003 | Milliron | ......................... | 345/647 |
| 2006/0158450 A1 * | 7/2006 | Ferguson et al. | ............. | 345/423 |
| 2007/0229543 A1 * | 10/2007 | Liepa et al. | .................... | 345/647 |
| 2012/0095738 A1 * | 4/2012 | Saito et al. | ......................... | 703/2 |
| 2012/0207368 A1 * | 8/2012 | Ishikawa et al. | .............. | 382/128 |

OTHER PUBLICATIONS

Kuriyama, Shigeru et al., "Discrete Paramterization for Deforming Arbitrary Meshes", 1999, p. 1-8.*

* cited by examiner

*Primary Examiner* — Chante Harrison
(74) *Attorney, Agent, or Firm* — Patterson & Sheridan, LLP

(57) ABSTRACT

A method allowing for quick manipulation of weight values associated with points on a polygonal mesh that is to be deformed. A point on the polygonal mesh may be selected by the user. Then, a solution space of possible positions for the selected point may be calculated by solving a deformation model for a range of weight values. A graphical representation of the solution space may be provided, such as a locus of possible positions for the selected point, where each point on the locus corresponds to a particular weight value. Manipulation of these weight values, and hence, the deformation of the polygonal mesh, may be achieved simply by selecting a position on the locus. The mesh may be updated to reflect the weight corresponding to the selected position.

21 Claims, 8 Drawing Sheets

GRAPHICAL USER INTERFACE FOR PERFORMING DEFORMATIONS

CROSS-REFERENCE TO RELATED APPLICATIONS

This application is a continuation-in-part of U.S. patent application Ser. No. 12/396,320, filed on Mar. 2, 2009, which is hereby incorporated herein by reference.

BACKGROUND

1. Field of the Invention

The present disclosure relates generally to computer graphics and animation and, more particularly, to techniques for deforming graphical objects.

2. Description of the Related Art

Deforming graphical models is an important operation in many areas of computer graphics. Deformation of planar curves is a basic operation in two-dimensional (2D) as well as three-dimensional (3D) graphics systems. Many significant industries, such as portions of the entertainment industry and the medical imaging industry, rely heavily on suites of computer graphics tools that include deforming operators. These operators may be included in a rendering engine configured to render a 2D image of a 2D or 3D model.

Objects are often deformed by manipulating a set of weighting fields that correspond to a set of feature specifications. Weighting fields modulate the influence of multiple source/target feature mappings on model points. The set of weighting fields is also defined over an undeformed model, and performs the function of determining the relative influence of a set of scaled transformations over elements in the undeformed model. Weighting fields define a region of influence. These weighting fields may be included in computing a deforming function.

Weighting fields may be modified using various techniques. One such technique may involve mouse cursor drags in screen space. For example, a user may drag a mouse such that drags to the left decrease the weight value, while drags to the right increase the weight value. Such a technique may not be without limitations. The user may have little idea as to the effect of a specified weight value on the deformation, and depending on the complexity of graphical objects, the update may take too long.

Accordingly, there remains a need in the art for an improved technique that minimizes the limitations of the prior art, as described above.

SUMMARY

Exemplary embodiments of the present disclosure may allow for quick manipulation of weight values associated with points on a polygonal mesh that is to be deformed. A point on the polygonal mesh may be selected by the user. Then, a solution space of possible positions for the selected point may be calculated by solving a deformation model for a range of weight values. A graphical representation of the solution space may be provided, such as a locus of possible positions for the selected point, where each point on the locus corresponds to a particular weight value. Manipulation of these weight values, and hence, the deformation of the polygonal mesh, may be achieved simply by selecting a position on the locus. The mesh may be updated to reflect the weight corresponding to the selected position.

One embodiment of the invention provides a computer-implemented method comprising generating a collection of points for a deforming model, wherein each point has a corresponding weight, receiving a user selection of one of the points in the collection of points, precalculating possible positions for the selected point by solving the deforming model for a range of possible weight values corresponding to the selected point, and providing a graphical indication of possible positions for the selected point based on the precalculated possible positions.

Another embodiment of the invention provides a computer-implemented method, comprising generating a collection of points for a deforming model, wherein each point in the collection of points has a corresponding weight, receiving a user selection of one of the points in the collection of points, precalculating a locus of possible positions for the selected point by solving the deforming model for a range of possible weight values corresponding to the selected point, providing a graphical indication of the locus of possible positions for the selected point, receiving a user selection of a point on the locus, and in response to the selection of the point on the locus, updating the deforming model to reflect a weight value corresponding to the point on the locus.

Still further embodiments of the invention provide a computer-implemented method, comprising generating a collection of points for a deforming model, wherein each point in the collection of points has a corresponding weight, receiving a user selection of one of the points in the collection of points, precalculating a plurality of possible positions for the selected point by solving the deforming model by varying one or more parameters for the selected point, providing a graphical indication of the possible positions for the selected point, receiving a user selection of a point of the possible positions, and in response to the user selection of the point, updating the deforming model to reflect a parameter value corresponding to the point of the possible positions.

Yet further embodiments of the invention provide a computer-implemented method, including: receiving a collection of points for a deforming model; receiving a user selection of a first point in the collection of points; replacing the deforming model with an approximation of the deforming model; and calculating possible positions for the first point by solving the approximation of the deforming model.

According to various embodiments, the one or more parameters may comprise scalar weight values, vectors, (u,v) coordinates associated with a 3D-to-2D mapping, or any other representation that can be input into a deforming model.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION OF EXEMPLARY EMBODIMENTS

One embodiment of the invention provides a computer-implemented method, including: receiving a collection of points for a deforming model; receiving a user selection of a first point in the collection of points; solving the deforming model based on setting one or more values of the deforming model to a constant to calculate possible positions for the first point in the deforming model; and providing a graphical indication of the possible positions for the first point in the deforming model Embodiments of the invention provide for efficient computation of multi-parameter weight values. Embodiments cache the Jacobians for the current sculpt being edited, and invalidate the cache whenever an avar that affects the final point positions is changed. Since the Jacobians are constant, embodiments of the invention do not perform a standard Newton iteration, but rather assume that the deformation operator is locally linear. This technique works in practice since sculpt offsets tend to be small and the user can compensate for error.

Exemplary embodiments of the present disclosure may allow for quick manipulation of weight values associated with points on a polygonal mesh that is to be deformed. Although embodiments of the invention are presented in related to a polygonal mesh, any point-based geometry may be used as well. These alternatives include curves, triangle meshes, quad meshes, polygonal meshes, Non Uniform Rational Basis Spline (NURBS) surface, subdivision surface meshes, a point cloud, a connected point cloud, or any other point-based geometry.

A point on the polygonal mesh may be selected by the user. Then, a solution space of possible positions for the selected point may be calculated by solving a deforming model for a range of weight values. A graphical representation of the solution space may be provided, such as a locus of possible positions for the selected point, where each point on the locus corresponds to a particular weight value. Manipulation of these weight values, and hence, the deformation of the polygonal mesh, may be achieved simply by selecting a position on the locus. The mesh may be updated to reflect the weight corresponding to the selected position.

Figure 1:
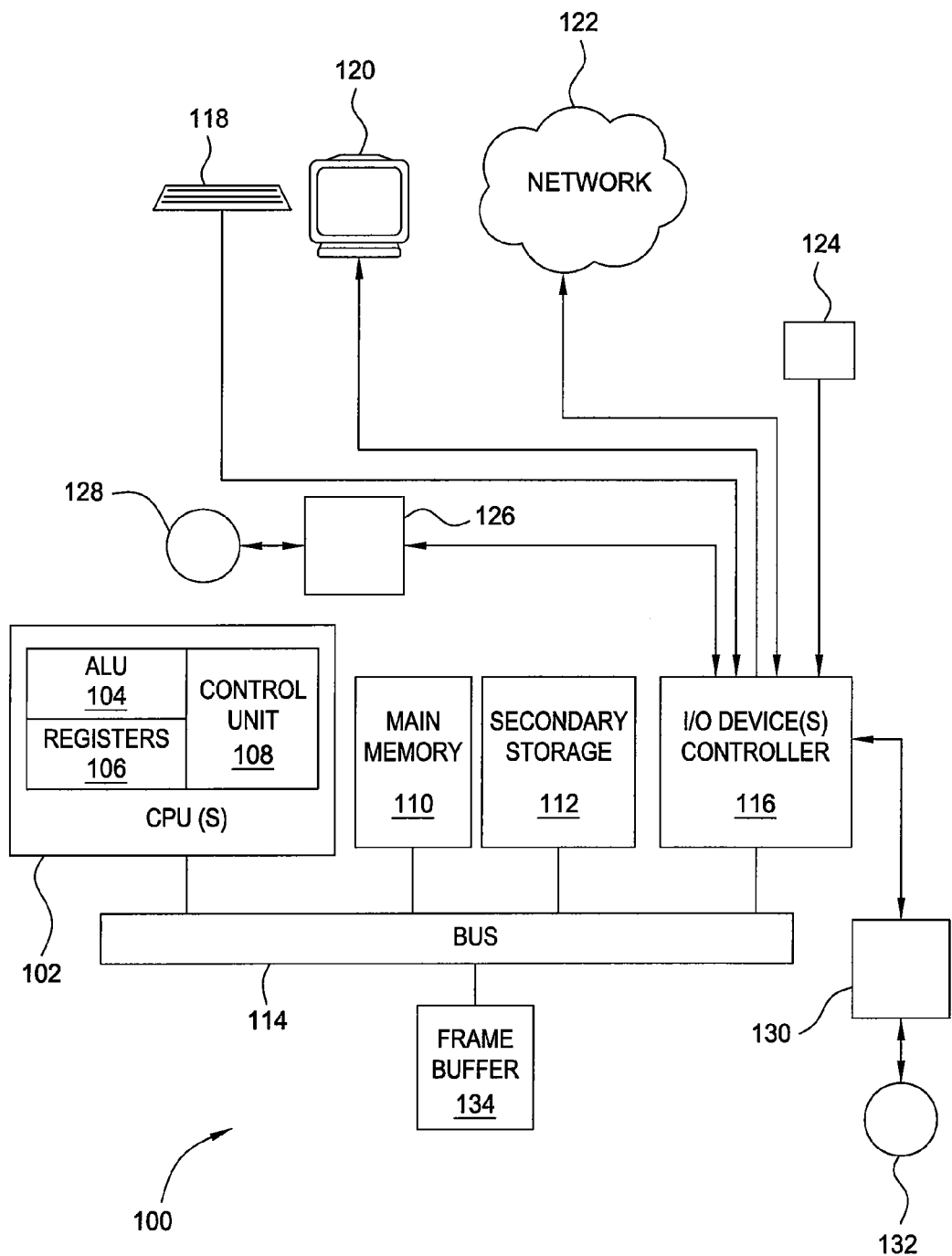
FIG. 1 is a block diagram of a computer system configured to implement one or more aspects of the invention.

FIG. 1 is a block diagram of a computer system configured to implement one or more aspects of the invention. The computer system 100 includes a microprocessor 102 comprising an arithmetic logic unit 104 for performing arithmetic and logic operations, a set of registers 106 providing rapid operational data access and storage, and a control unit 108 for fetching, decoding, and executing instructions. The computer system 100 further comprises a main memory 110 capable of storing an executing program and data used by the program, a secondary storage 112 capable of storing more information than the main memory 110 and which may comprise one or a collection of devices such as magnetic or optical disks, or the like. In addition, the computer system 100 comprises a bus 114, communicatively coupled with the microprocessor 102, the main memory 110, and the secondary storage 112 capable of providing a datapath for moving data and instructions among attached devices.

The computer system 100 also comprises an input/output device controller 116 communicatively coupled with the bus 114 and configured for controlling input/output from devices. The input/output device controller 116 may operate with, for instance, a keyboard 118, a display 120, a data network 122, and a pointing device 124. In addition, the input/output device controller 116 may operate with a media drive 126 such as a disk drive, CD drive, or the like. The media drive 126 may operate with a computer-readable storage medium 128 capable of storing computer-readable program code able to configure the microprocessor 102 to embody aspects of the disclosure. The input/output device controller 116 may also operate with a graphics product writer 130 such as a film writer, DVD writer, or the like. The graphics product writer 130 operates with a computer graphics product 132 such as CD-ROM or DVD.

In some embodiments, geometric deformations are created by the computer system 100 and may be written on the computer graphics product 132, stored in main memory 110, or output to display 120. The graphics product writer 130 and the display 120 typically use a frame buffer 134. As depicted, the computer system 100 is general purpose computing machinery. As one of skill in the art appreciates, programmed instructions may configure general purpose computing machinery to embody structures for performing functions in accordance with aspects of the disclosure. In one embodiment, the function described herein are associated with a rendering application stored in main memory 110 and executed by CPU 102.

Programmed instructions, either in source code or compiled form ("code") may be stored on the computer-readable storage medium 128. The computer system 100 may also operate with a compiler (not shown) to generate executables from source code. The computer-readable storage medium 128 having code for suitable configuring the computer system 100 to carry on features and/or perform functions in accordance with the disclosure may be a made and used in any conventional way. Special purpose computing machinery may also be used, as may programmable or evolvable hardware; and the particular hardware environment is not fundamental. Rather, one skilled in the art will recognize numerous structures of programmed or programmable logic capable of being configured to embody aspects of the disclosure.

In an illustrative embodiment of the disclosure, computer program code configures a graphics computer system such as the computer system 100 to provide a system for geometric deformations. In accordance with the illustrative embodiment, the deformation acts on an undeformed model represented as a point-valued function M(u) defined on a source domain U such that:

$$M(u)=\text{model point, for } u \in U.$$

Any of many conventional model representations may be used depending on the type of model being deformed. In some embodiments, a vertex mesh is used, in others an image is used. When a vertex mesh is used, U could be the set of n vertex indices 1 . . . n and M(u) is the vertex indexed by u∈U. In vertex mesh embodiments, the deformation will move the vertices to new positions in space. The mesh may represent, for instance, a polygonal model or the control vertices of a smooth surface. When an image is used, U could be the 2D plane, and M(u)=u is defined over the plane. The deformation will create a mapping of pixel coordinates between the original and deformed images, for subsequent sampling of the image data. One skilled in the art having the benefit of this disclosure will readily appreciate other model representations operable with features of the disclosure and accordingly are within the scope and spirit of the disclosure.

In accordance with an illustrative embodiment, output of a deformation may be expressed as a deforming function, D(u, M), that is a transformation-valued function defined on the domain U and taking a value u∈U and the model M as input. To compute the deformed model M that is a point-valued function defined on the domain U, as is M(u), the deforming function is evaluated at u and applied to the point given by evaluating the model at u. For clarification of exposition, it is helpful to denote the application of a translation T to a point p by T<p>. Notationally:

$$M'(u)=D(u,M)<M(u)>$$

One simple deforming function convenient in some instances is a displacement model. For instance, the output of the deformation may be generated with a vector-valued function defined on the domain U. The displacement model may then be added to the undeformed model to yield the deformed model.

Further in accordance with the illustrative embodiment, a set of feature specifications is used to represent mappings from source to target features. Each of the set of feature specifications comprises a source feature, a target feature, and related deformation parameters for controlling deformation caused by the feature specification. In some instances the number of related deformation parameters may be zero. Again, as noted above, some embodiments of the disclosure are not feature based and, in such case, a parameter set is used for controlling the deformation.

Surfaces of objects in a model are often represented by a polygonal mesh that may be manipulated to achieve desired results. A polygonal mesh is generally defined by a collection of vertices, edges and faces that defines the shape of an object in 3D computer graphics. Such a mesh contains points with associated weights. The mesh may be deformed using by varying the weights associated with the points in the mesh. As described above, persons having ordinary skill in the art would understand that embodiments of the invention are not limited to polygonal meshes, but include other point-based geometry, including, but not limited to, triangle meshes, quad meshes, polygonal meshes, Non Uniform Rational Basis Spline (NURBS), subdivision surface meshes, point clouds, or any other point-based geometry.

Figure 2A:
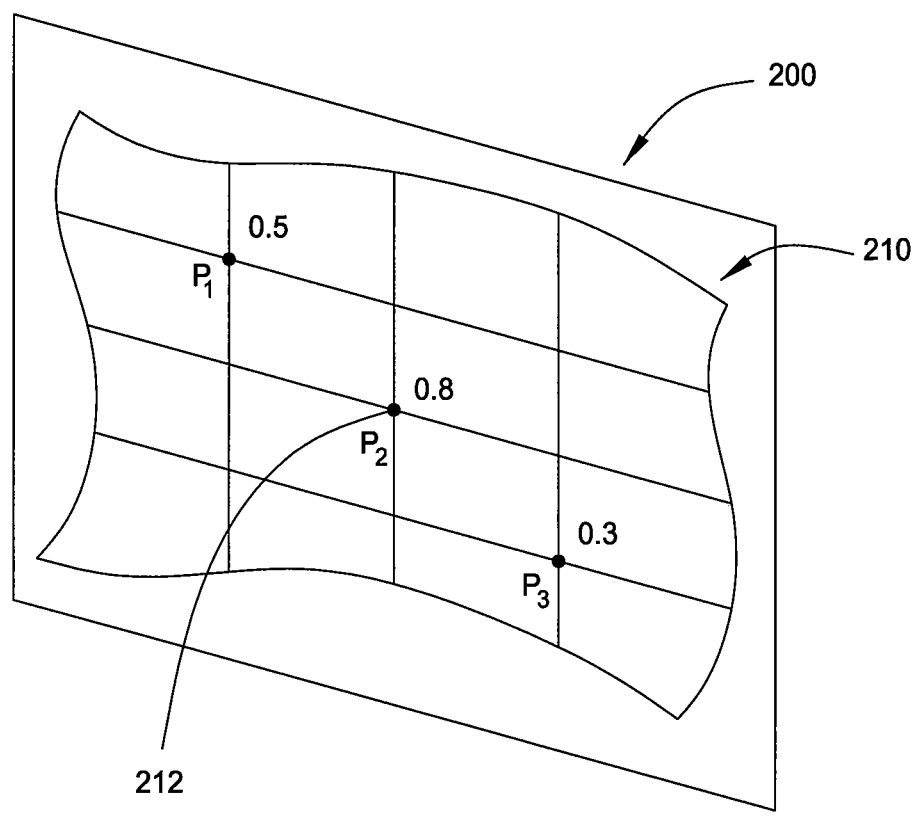
FIGS. 2A and 2B illustrate an example Graphical User Interface (GUI) screen containing a polygonal mesh before and after deformation, according to various embodiments of the invention.

FIG. 2A illustrates an example graphical user interface (GUI) screen 200, that may allow a user to manipulate of a mesh 210, in accordance with certain aspects of the present disclosure. As illustrated, the mesh 210 has points 212, with three points $P_1$, $P_2$ and $P_3$ shown in the portion of the mesh 210 illustrated in the GUI screen 200. In the illustrated example, points $P_1$, $P_2$ and $P_3$ have corresponding weights 0.5, 0.8 and 0.3.

Figure 2B:
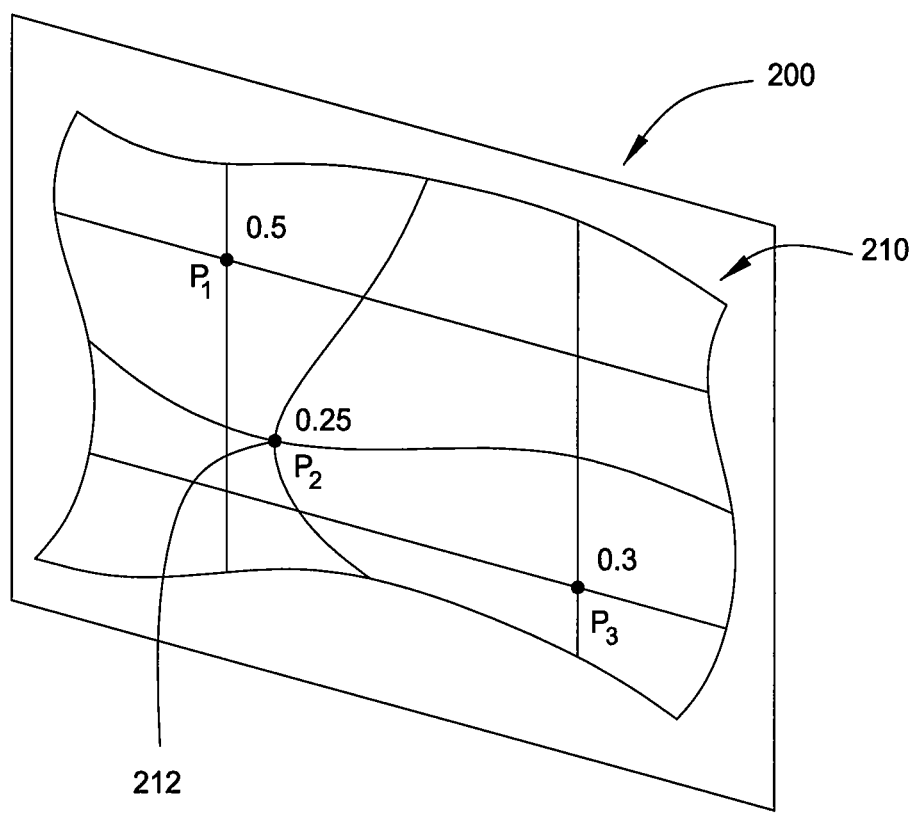

According to certain embodiments, to deform this mesh, the user may adjust one or more of the weights. For example, a user may select a point and specify a weight value. The deformation is achieved based on the specified weight value. To illustrate this, point $P_2$ with a current weight value of 0.8 in FIG. 2 may be selected. By changing the value of the weight, for example, to 0.25, the mesh may be deformed in the manner illustrated in FIG. 2B. FIG. 2B illustrates how changing the weight value of P2 may effect the location of neighboring points P1 and P3.

As described above, adjusting the weights may involve mouse cursor drags in screen space. For example, drags to the left decreasing the weight value while drags to the right increasing it. Unfortunately, conventional GUIs provide the user with no indication as to the effect of a specified weight value on the deformation, and depending on the complexity of graphical objects, the update may take too long. Thus, in conventional systems, deforming a mesh is typically a time consuming process, in which weights of one or more points are iteratively varied to position a point until the desired deformation is achieved.

Embodiments of the present disclosure, however, may present the user with a graphical representation of the possible positions of a point, corresponding to a range of possible weight values, which may help facilitate the deformation process. A user may, thus, be able to rapidly select a weight value that positions a point at a location that achieves a desired deformation of the mesh.

Figure 3:
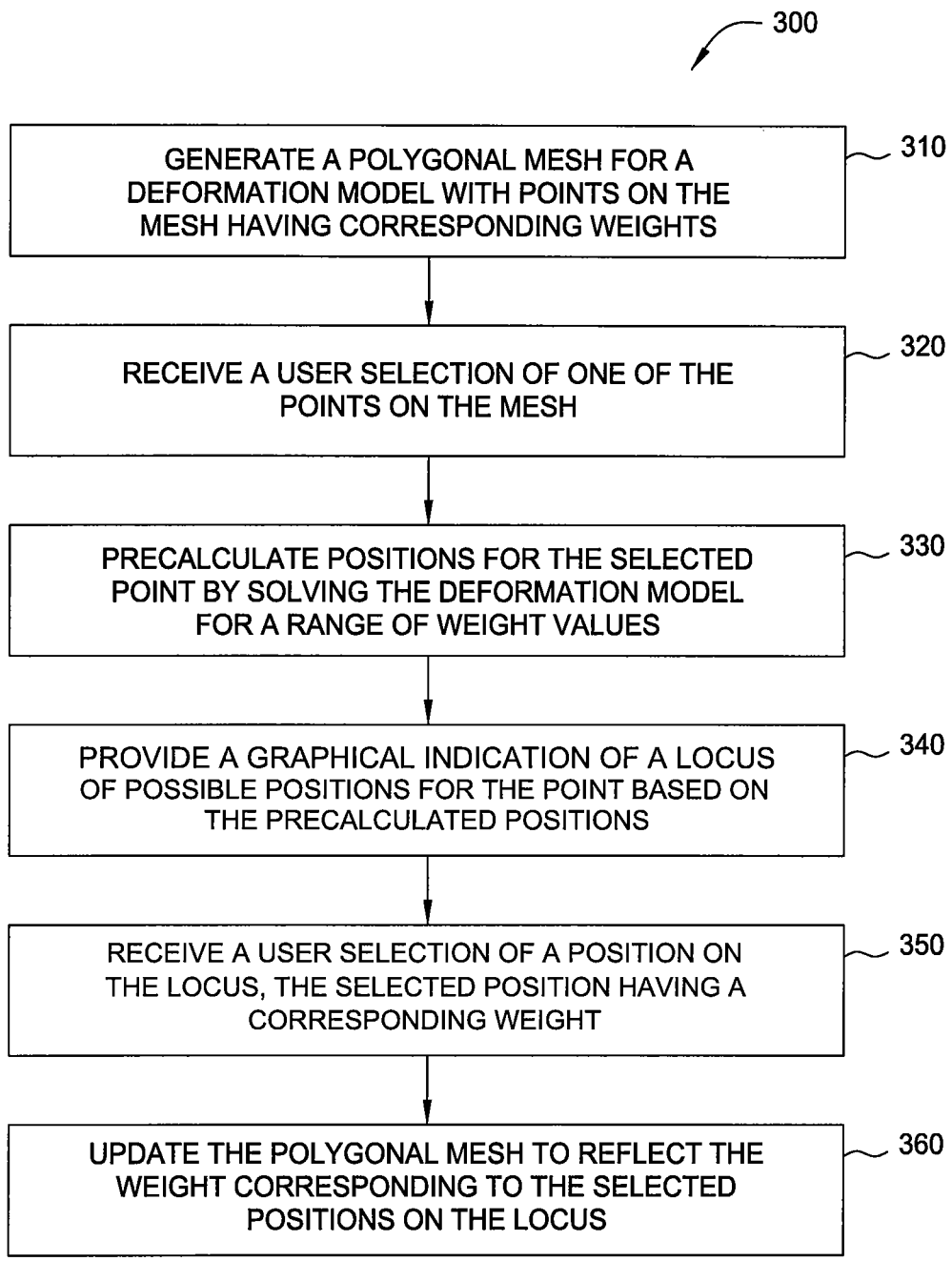
FIG. 3 illustrates example operations, according one embodiment of the invention.

FIG. 3 illustrates an example method 300 of operations according to certain embodiments of the disclosure. Operations may be performed by a suitable computer program, e.g., a rendering engine, implemented on a computer system such as the computer system 100 illustrated in FIG. 1. The operations may be performed, for example, as part of an animation package that provides a GUI allowing a user to perform deformation operations for a surface of a 3D model of an animated object. The operations may be described with reference to FIGS. 4A and 4B, which illustrate example GUI screens. Persons skilled in the art would understand that, even though the method 300 is described in conjunction with the systems of FIGS. 1-2B, any system configured to perform the method steps, in any order, is within the scope of the present invention.

The method beings are step 310, where the rendering engine generates a polygonal mesh for a deforming model. Continuing with the example illustrated in FIGS. 2A and 2B, the mesh 210 may contain points with corresponding weight values that may be manipulated to achieve a particular desired deformation.

At step 320, the rendering engine receives a user selection of one of the points. At step 330, the rendering engine pre-calculates possible positions of the selected point by solving the deforming model for a range of possible weight values. At step 340, the rendering engine provides a graphical representation of a locus of the possible positions.

Figure 4A:
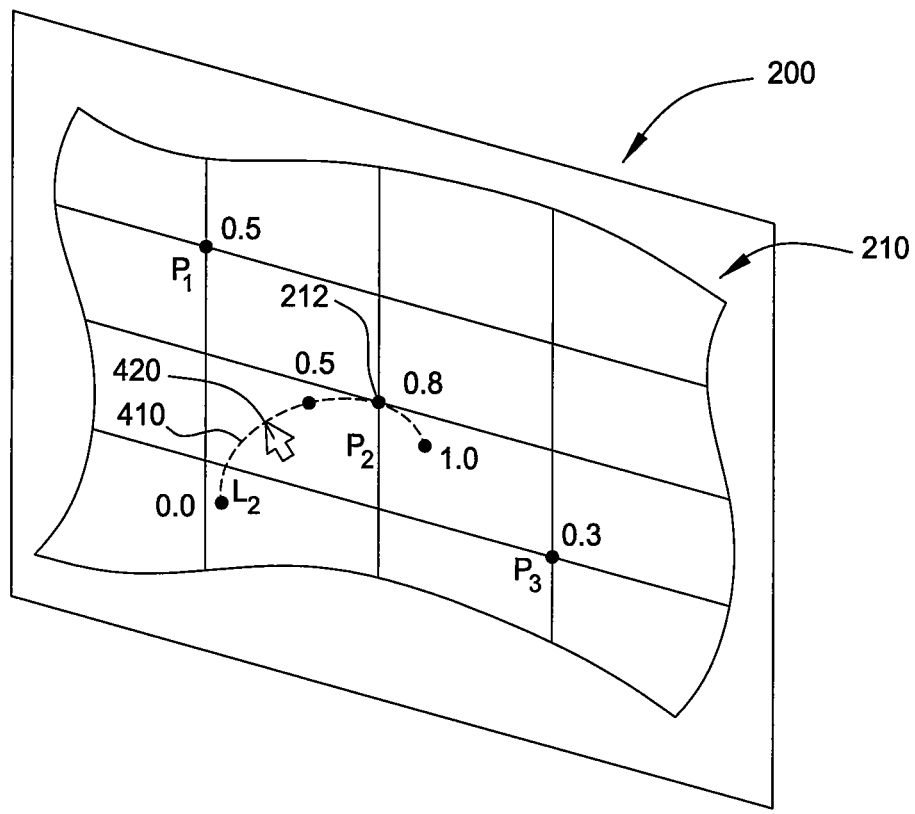
FIG. 4A illustrates a Graphical User Interface (GUI) screen that provides a locus of possible positions calculated for a selected point, according one embodiment of the invention.

FIG. 4A illustrates and example locus 410 of possible positions for selected point $P_2$. In the illustrated example, a locus of possible positions corresponding to weight values ranging from 0.0 (left hand side of the locus) to 1.0 (right hand side of the locus) are shown, with positions corresponding to intermediate weight values 0.5 and 0.8 also shown.

According to certain embodiments, possible positions for only a limited range of weight values may be shown. For example, in the illustrated example, 0.0 to 1.0 may be a subset of the actual range of weight values available for $P_2$. Limiting the range of weight values may help speed the operations necessary to precalculate the corresponding positions on the locus. Further, a limited number of positions may be actually precalculated and other points on the locus 410 displayed to the user may be calculated by interpolation. In one embodiment, the interpolated points are calculated by positioning a line segment between two precalculated positions. In alternative embodiments, the interpolated points are calculated by fitting a continuous curve between the precalculated positions.

At step 350, the rendering engine receives a user selection of a point on the locus having a corresponding weight value. At step 360, the rendering engine updates the polygonal mesh to reflect the weight value corresponding to the selected position on the locus.

Thus, displaying the locus of possible points for $P_2$, corresponding to a range of weight values, may allow a user to simply select a point on the locus in order to adjust the corresponding weight value for the deforming model. For example, a user may simply select a desired point on the locus 410 with a cursor 420 (e.g., via a mouse "click") and the corresponding weight value in the deformation model may be automatically updated.

Figure 4B:
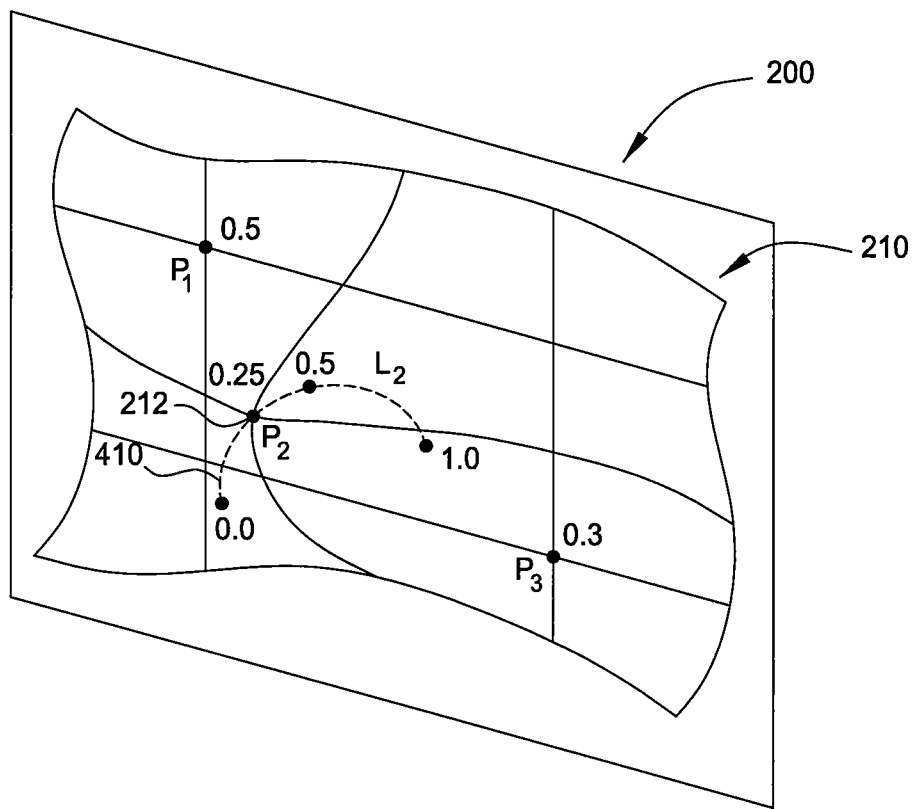
FIG. 4B illustrates an updated polygonal mesh so as to reflect a weight value selected by selecting a point on the locus shown in FIG. 4A, according one embodiment of the invention.

As illustrated in FIG. 4B, if the user selects a point on locus 410 corresponding to a weight value of 0.25, the deforming model may be automatically updated to reflect the corresponding weight value and the graphical representation of the mesh 210 may be updated accordingly. In this manner, precalculating the positions of a selected point corresponding to a range of weight values may facilitate the user in selecting a weight value for a particular value that achieves a desired deformation, possibly avoiding lengthy iterations. The user may select a position on the locus that is not precalculated. For example, the actual position corresponding to the weight value of 0.25 may not have been precalculated. The corresponding point on the locus may have been determined by interpolation or not even determined at all. In other words, the weight value for the selected point may be determined by interpolation between points on the locus that are known.

Figure 5:
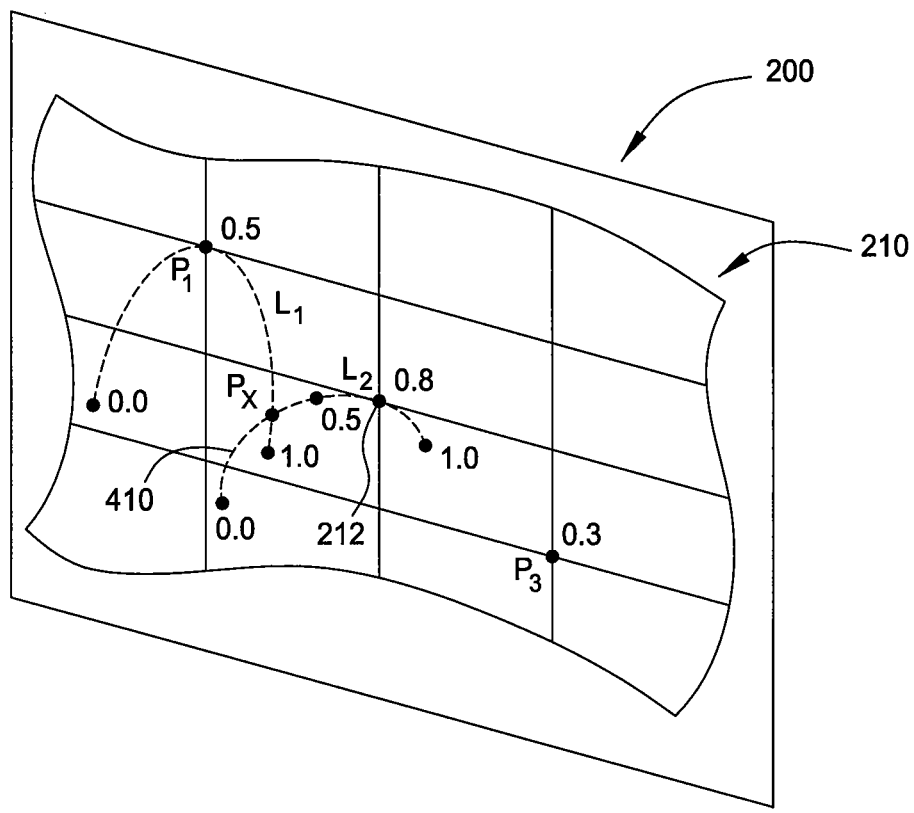
FIG. 5 illustrates a Graphical User Interface (GUI) screen that provides loci of possible positions calculated for a plurality of selected points, according one embodiment of the invention.

According to certain embodiments, graphical indication of loci of possible positions may be provided for a plurality of points. For example, FIG. 5 illustrates loci L1 and L2 for two points $P_1$ and $P_2$. The loci $L_1$ and $L_2$ for points $P_1$ and $P_2$ may be calculated for the same range of weight values (e.g., 0.0 to 1.0) or for different ranges of weight values.

Providing the locus of more than one point may make the user aware of the relationship between the points after deformation. For example, in some cases it may be undesirable that two particular points intersect after deformation. The user may avoid such an intersection by analyzing the loci to determine the corresponding weight values that would cause the intersection. Such a point of intersection is illustrated as $P_x$ in FIG. 5.

The locus of possible positions for the selected point may be precalculated without updating the entire deforming model. In this manner, a good approximation of the solution space may be achieved even with sparse sampling, which may save computational overhead. Thus, the deforming model equations may be solved for just the selected point to precalculate the positions corresponding to the range of weight values without solving for all points, which may allow the locus to be displayed in real time with little or now noticeable delay to the user. The deforming model may only be solved for all displayed points once the user has selected a point on the locus.

According to certain embodiments, a user may be able to control a number of parameters associated with the technique described above. For example, a user may be able to set configuration parameters that specify the range of weight values and/or the number of possible positions that are precalculated in order to achieve acceptable performance.

Those skilled in the art will recognize that precalculating points may be performed to provide a user with an indication of a corresponding change without displaying a locus. For example, according to certain embodiments, a locus of points may be precalculated but not actually displayed. However, when the user moves a selected point (e.g., by dragging it with a mouse), movement of the point may be restricted to travel along the locus. In this manner, the user may still be able to see the effect of varying the weight value for a particular point.

This may improve interaction and, at the same time, restrict the location of the selected point to a precalculated solution space of possible positions. In this manner, a user may be provided with a preview of a projected change to a complex image by simply focusing on a particular point on the image.

While the examples described above referred to weight values for a point on a deforming model, similar techniques may be applied to preview the effect of changing some other value of a model. For example, it may be insightful to use a parameter like a radius that defines the movement of a physical attribute, such as the allowable arc that a bow may travel when shooting an arrow. The radius value may be changed, while precalculated arcs the bow may travel are displayed.

As described above, embodiments of the invention may be used to determine a single scalar value weight of a point given a desired point position. Other embodiments of the invention may be used to determine a vector offset of a point given a desired point position. According to these embodiments, sculpt vectors associated with the points in a model comprise the multi-parameter weight values that are input to a deforming operator. According to various embodiments, the one or more parameters may comprise scalar weight values, vectors, (u,v) coordinates associated with a 3D-to-2D mapping, or any other representation that can be input into a deforming model.

Sculpting of a model is the process by which embodiments solve for sculpt offset vectors as the user deforms the final point positions. After the deformation is performed, the user can adjust the deformed positions to final positions. Accordingly, the deformation becomes an offset applied to another offset. Given this final position, embodiments of the invention determine how to change the original vector offset so that the final positions are achieved after applying the deforming operator.

Embodiments of the invention treat the portion of the rig that fires after the sculpt as a non-linear function from offsets to final points positions. However, the deforming function is unknown. As persons having ordinary skill in the art would understand, a Jacobian determinant (or simply Jacobian) can be calculated for the matrix of first-order partial derivatives of a vector-valued (or scalar-valued) function with respect to another vector. However, the deforming function is computationally expensive to evaluate.

Figure 6:
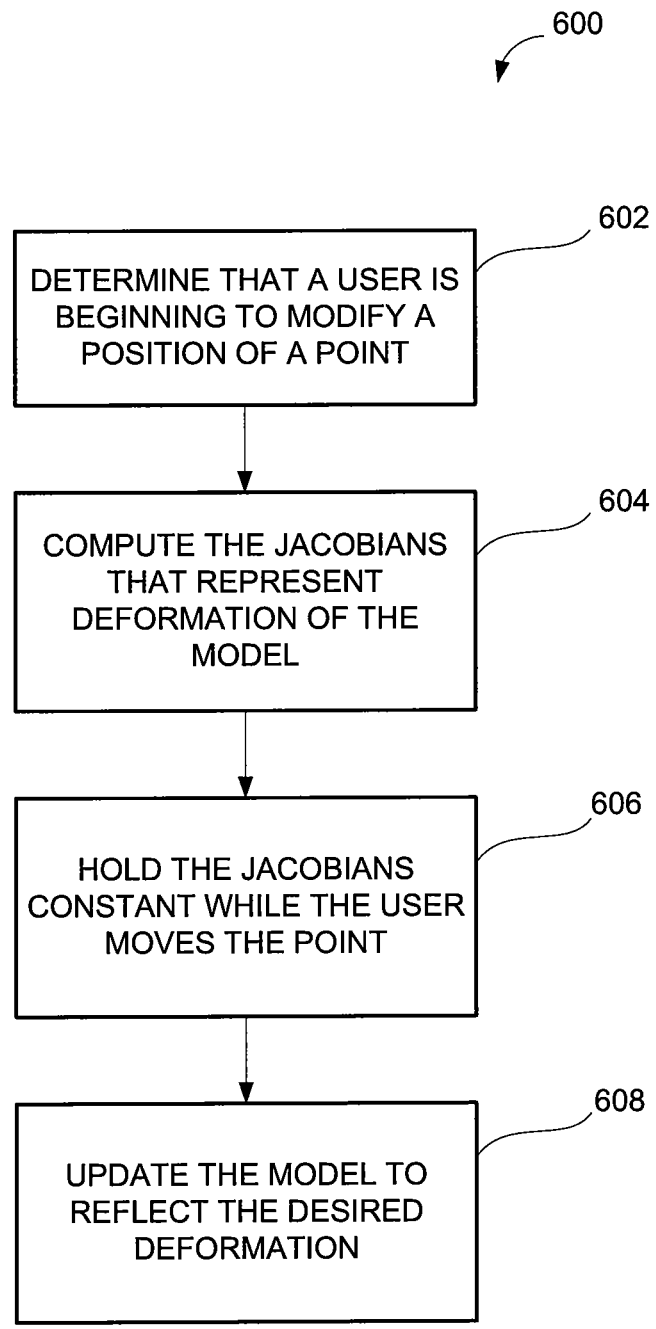
FIG. 6 is a flow diagram of method steps for efficient computation of multi-parameter weight values, according to one embodiment of the invention.

Embodiments of the invention are related to the GUI feedback in the form of interactive (i.e., live) posing of the manipulated point, by efficient computation of the multi-parameter weight value (i.e., the sculpt vector) corresponding to the user interaction with a spatial manipulator for that point. FIG. 6 is a flow diagram of method steps for efficient computation of multi-parameter weight values, according to one embodiment of the invention. Persons skilled in the art would understand that, even though the method 600 is described in conjunction with the systems of FIGS. 1-2B and 4A-5, any system configured to perform the method steps, in any order, is within the scope of embodiments of the invention.

The method 600 begins at step 602, where a processing unit determines that user is beginning to modify the position of a point in a model. In some embodiments, the point is represented by a vector offset. Determining that the user is beginning to modify the position of the point may comprise detecting a "mouse click down" event received from a mouse or other input device coupled to a computer system.

At step 604, the processing unit computes the Jacobians that represent the deformation of the model. In some embodiments, the deformation operation is evaluated three times, one for each of the x-, y-, and z-directions. At step 606, after the Jacobains are calculated, the processor holds the Jacobians constant while the user moves the point. In some embodiments, the Jacobians are cached and reused. Accordingly, the same Jacobians are used to solve for the new offset. When the deformation operation is non-linear, the solution for the new offset may not be correct numerically and may not achieve the position that the user desired. However, there would be no discontinuous jump and the user can compensate interactively for the deviation to achieve the desired point. In embodiments where the deformation operation is linear, the Jacobians would stay the same and the new offset is numerically correct. At step 608, the processor updates the model to reflect the desired deformation. In other embodiments, any technically feasible technique other than computing a Jacobian can be used to replace the deforming model with an approximation of the deforming model.

In other implementations, the deformation function can be represented in a non-linear way instead of using constant Jacobians. For example, a lattice can be used to represent the deformation. Such an implementation may provide a more accurate representation of the deformation operation, but may also require additional computational complexity.

In addition, in some embodiments, interdependent points may exist in the model that may affect the deformer solve. For example, a character may have symmetric left and right halves. In some embodiments, when a user perturbs one point to compute the Jacobian, another point would also move due to symmetry (i.e., on the other side of the character's face). Some embodiments partition the points into symmetry classes, such as left and right sides, and evaluate the Jacobians separately. Such a technique also applies to scalar weight value case, described above.

In sum, embodiments of the invention provide for efficient computation of multi-parameter weight values. Embodiments cache the Jacobians for the current sculpt being edited, and invalidate the cache whenever an avar that affects the final point positions is changed. Since the Jacobians are constant, embodiments of the invention do not perform a standard Newton iteration, but rather assume that the deformation operator is locally linear. This technique works in practice since sculpt offsets tend to be small and the user can compensate for error.

While the forgoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for updating a deforming model, comprising:
   receiving a user selection of a first point from a collection of points for a deforming model;
   replacing the deforming model with an approximation of the deforming model; and
   calculating, using a processing unit, a locus of possible positions to which the first point may be relocated by solving the approximation of the deforming model, wherein each possible position in the locus is associated with a different weight value for the first point.

2. The method of claim 1, wherein the approximation of the deforming model comprises a Jacobian determinant associated with the deforming model.

3. The method of claim 1, wherein the approximation of the deforming model comprises holding constant one or more values that affect a pose of the deforming model.

4. The method of claim 3, wherein the one or more values comprise a result of a deformation operation associated with the deforming model that is evaluated in at least one of an x-direction, a y-direction, and a z-direction.

5. The method of claim 1, wherein each point in the collection of points is represented by a vector.

6. The method of claim 5, wherein the calculated possible positions for the first point comprise one or more vector offsets.

7. The method of claim 1, wherein the deforming model is non-linear and is represented by a lattice.

8. The method of claim 1, wherein the collection of points comprises a curve, a triangle mesh, a quad mesh, a polygonal mesh, a subdivision surface mesh, a non-uniform rational basis spline (NURBS) surface, a point cloud, or a connected point cloud.

9. The method of claim 1, further comprising calculating possible positions for a second point that is interdependent on the first point based on the possible positions for the first point.

10. A non-transitory computer-readable storage medium storing instructions that, when executed by a processor, causes a computer system to update a deforming model, by performing the steps of:
    receiving a user selection of a first point from a collection of points for a deforming model;
    replacing the deforming model with an approximation of the deforming model; and
    calculating a locus of possible positions to which the first point may be relocated by solving the approximation of the deforming model, wherein each possible position in the locus is associated with a different weight value for the first point.

11. The computer-readable storage medium of claim 10, wherein the approximation of the deforming model comprises a Jacobian determinant associated with the deforming model.

12. The computer-readable storage medium of claim 10, wherein the approximation of the deforming model comprises holding constant one or more values that affect a pose of the deforming model.

13. The computer-readable storage medium of claim 12, wherein the one or more values comprise a result of a deformation operation associated with the deforming model that is evaluated in at least one of an x-direction, a y-direction, and a z-direction.

14. The computer-readable storage medium of claim 10, wherein each point in the collection of points is represented by a vector.

15. The computer-readable storage medium of claim 14, wherein the calculated possible positions for the first point comprise one or more vector offsets.

16. The computer-readable storage medium of claim 10, wherein the deforming model is non-linear and is represented by a lattice.

17. The computer-readable storage medium of claim 10, wherein the collection of points comprises a curve, a triangle mesh, a quad mesh, a polygonal mesh, a subdivision surface mesh, a non-uniform rational basis spline (NURBS) surface, a point cloud, or a connected point cloud.

18. A computer system, comprising:
a processor configured to:
receive a user selection of a first point from a collection of points for a deforming model;
replace the deforming model with an approximation of the deforming model; and
calculate a locus of possible positions to which the first point may be relocated by solving the approximation of the deforming model, wherein each possible position in the locus is associated with a different weight value for the first point.

19. The computer system of claim 18, wherein the approximation of the deforming model comprises a Jacobian determinant associated with the deforming model.

20. The computer system of claim 18, wherein the approximation of the deforming model comprises holding constant one or more values that affect a pose of the deforming model.

21. The computer system of claim 20, wherein the one or more values comprise a result of a deformation operation associated with the deforming model that is evaluated in at least one of an x-direction, a y-direction, and a z-direction.

\* \* \* \* \*